Sept. 1, 1964 C. B. CAPERTON 3,146,476
SCREW DRIVE FOR RODDING MACHINE
Filed May 2, 1963 4 Sheets-Sheet 2

INVENTOR.
Charles B. Caperton,
BY
Paul & Paul
ATTORNEYS.

Sept. 1, 1964     C. B. CAPERTON     3,146,476
SCREW DRIVE FOR RODDING MACHINE

Filed May 2, 1963     4 Sheets-Sheet 3

INVENTOR.
Charles B. Caperton,
BY Paul & Paul
ATTORNEYS.

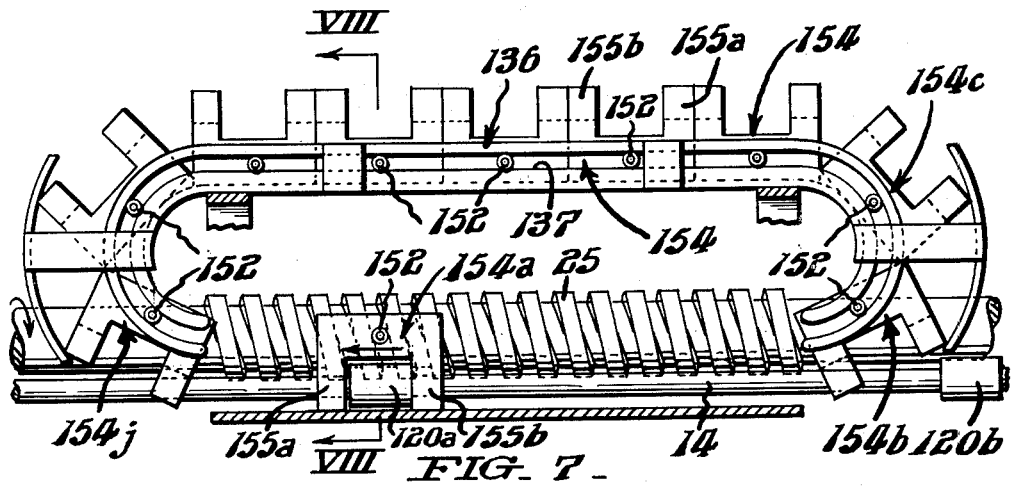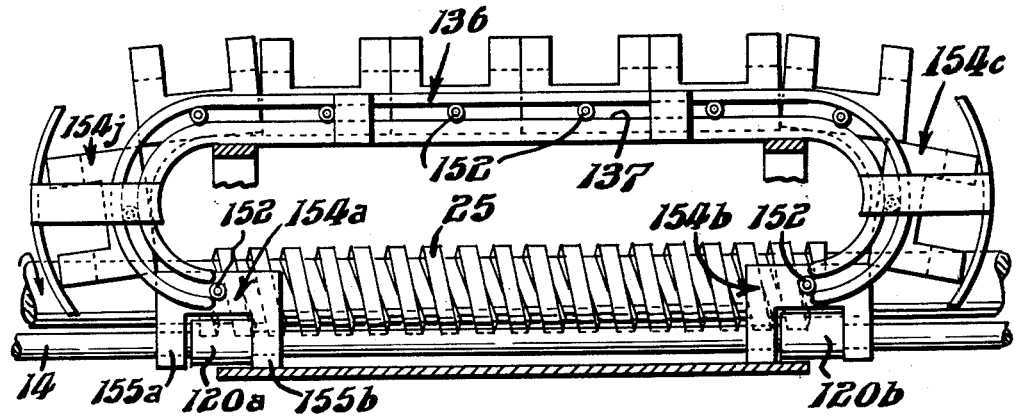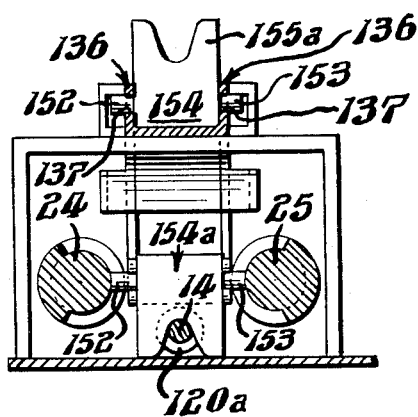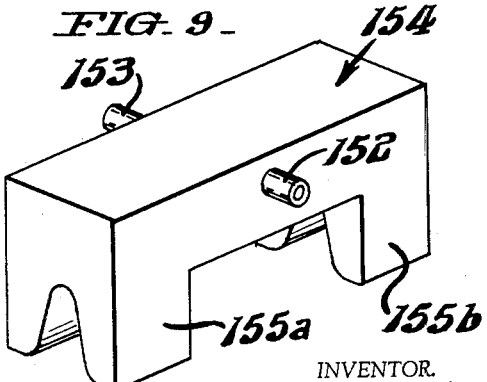

United States Patent Office 3,146,476
Patented Sept. 1, 1964

3,146,476
SCREW DRIVE FOR RODDING MACHINE
Charles B. Caperton, 1832 Pine St., Philadelphia, Pa.
Filed May 2, 1963, Ser. No. 277,530
7 Claims. (Cl. 15—104.3)

This invention relates to a rodding machine for handling sectional rod of the type used in sewer cleaning and clearing. More particularly, the invention provides a new form of drive for such a rodding machine.

As is known, a sectional rod is composed of a large number of individual sections of rod, each for example 39" or 48" long, coupled together end-to-end by couplers. The couplers may be of the type shown in Crane Patent 2,152,636.

One form of rodding machine for handling sectional rod is shown in Ciaccio Patent 2,544,256. As shown in that patent, the sectional rod is pushed axially by means of pusher blocks or dogs mounted on and carried by an endless sprocket chain which is driven by a suitable sprocket transmission. The dogs have a yoke portion which straddles the rod, and when a dog, carried along by the endless sprocket chain, comes into engagement with one of the couplers, it pushes the coupler along, thereby advancing the sectional rod axially. The direction of movement of the endless chain is reversible, and the sectional rod is moved in one direction or the other according to the direction of movement of the endless sprocket chain.

When the tool at the lead end of the sectional rod meets a particularly heavy obstruction, the load on the sprocket chain becomes great; and under such conditions, the operation of the drive is sometimes unsatisfactory.

The object of my present invention is to provide an improved drive for the pusher dogs, one that is adapted to provide a strong positive drive which will assure satisfactory operation despite the heavy loads and heavy obstructions which may be encountered.

The foregoing object is accomplished in accordance with my present invention by providing a screw form of drive comprising a pair of parallel spaced-apart driven helical gears or screws which form therebetween a passageway through which the sectional rod passes as it moves out of or into the rodding machine. The pusher dogs are provided with opposing lateral projections or ears which are engaged and moved along by the pair of driven helical gears or screws during rotation thereof. Transport means, which may but need not be an endless belt, are provided for returning the dogs from the exit to the entrance end of the passageway formed by the pair of screws. Where an endless belt is used for this purpose, such belt serves as a carrier for the dogs, but the belt itself is not positively driven. Motion is imparted to the endless belt by the movement of the dogs which are mounted thereon and which are positively driven by the driven screws.

My invention will become clear from a reading of the following detailed description of several preferred embodiments selected for illustration in the drawing, in which:

FIGS. 6 and 7 are diagrammatic side elevational views showing an alternate form of transport means for returning the pusher dogs from one end of the screw drive to the other;

FIG. 8 is a diagrammatic view in section along the line VIII—VIII of FIG. 6;

FIG. 9 is a diagrammatic view of the double-yoked dog used in the alternate form of dog carrier shown in FIGS. 6 and 7; and FIG. 10 shows a slightly modified form in which the screw drive is longer than the endless belt and in which the pusher dogs enter and leave the screw drive inward of the ends thereof.

Figure 1:
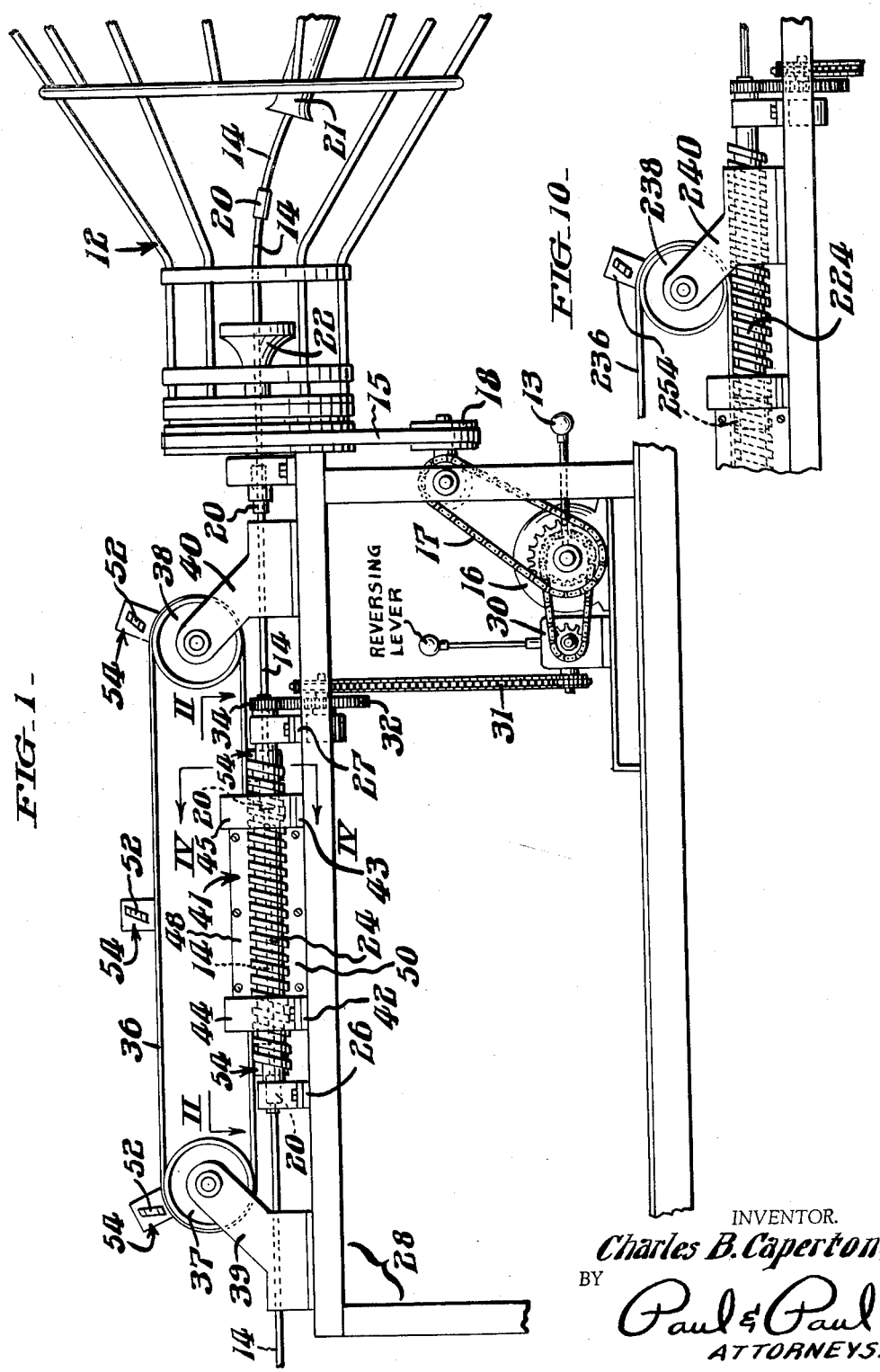
FIG. 1 is a diagrammatic side elevation of a rodding machine illustrating my new screw drive.

Referring now to the drawing, FIG. 1 is a fragmentary representation of a rodding machine having a conical cage 12 in which the sectional rod 14 is stored in coiled form. Cage 12 may be driven rotationally, as by the V-belt 15, in one direction to turn the tool into the obstruction, and in the opposite direction to turn the tool out of the obstruction, but the cage need not ordinarily be rotated during mere feeding out and reeling in of the rod. V-belt 15 may be driven by any suitable mechanism but is illustrated in the drawing as being driven by a reversible motor or engine 16 through a chain transmission 17 and drive pulley 18, under the control of clutch level 13.

The sectional rod 14 comprises a plurality of individual steel rods, each having a length, for example, of 39" or 48", coupled together end-to-end by couplers 20. The couplers 20 may be of the type shown in Crane Patent 2,152,636. A guide tube 21 (which is not fixed to the cage 12) guides the sectional rod into coiled formation in the cage during reeling in of the rod, and assists in the uncoiling the coiled rod without entanglement during feeding out of the rod. A flared guide funnel 22 at the apex of the conical cage 12 guides the rod into the drive head portion of the machine during feedout, and into the cage during reeling in.

In accordance with my present invention, and as illustrated in FIGS. 1–5, the drive head portion of the rodding machine includes a pair of horizontal helical gears or screws 24, 25 disposed in parallel spaced-apart relation to each other, forming a passageway 29 therebetween through which the sectional rod passes during feeding out from and reeling back into the rodding machine. The screws 24, 25 may be journalled in suitable bearings in suitable bearing supports mounted on cross members 26 and 27 of the frame 28 of the machine.

Figure 3:
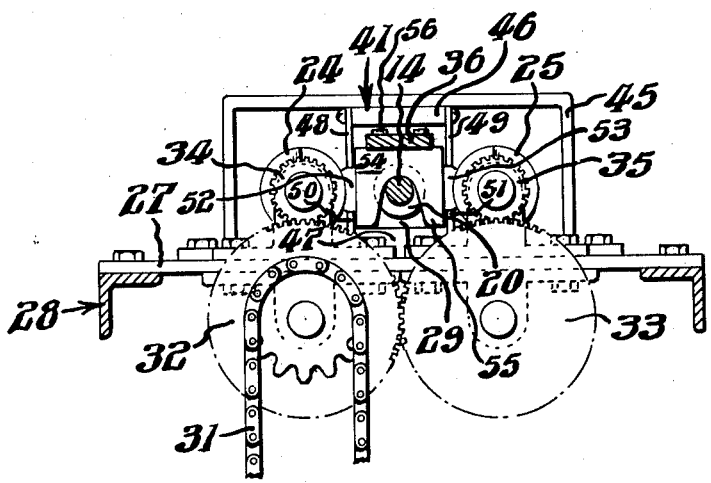
FIG. 3 is a diagrammatic side elevational view looking in along the line III—III of FIG. 2.
Figure 5:
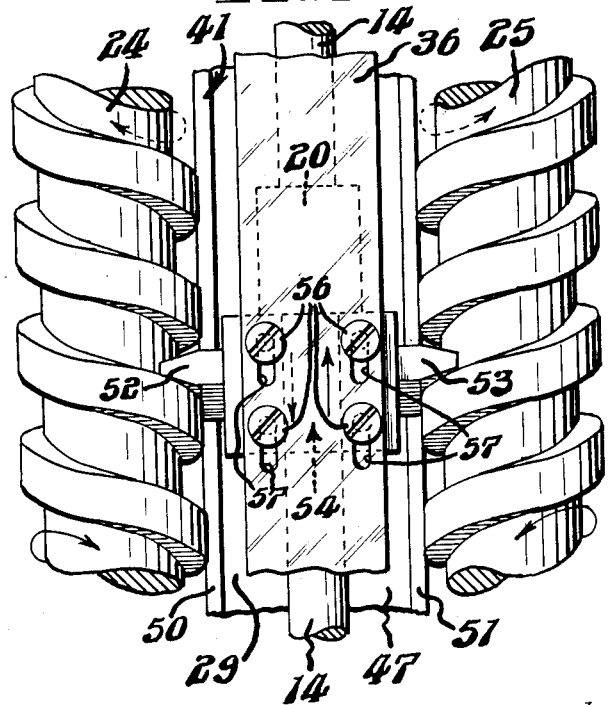
FIG. 5 is a diagrammatic top view looking down along the line V—V of FIG. 4.

The screws 24, 25 may be driven by any suitable drive mechanism, but are illustrated in FIG. 1 of the drawing as being driven by the motor or engine 16 through the speed-changing mechanism 30 and the chain and sprocket transmission 31. As seen in FIG. 3, transmission 31 includes the driven output gear 32 which is in mesh with and drives a second output gear 33. Output gears 32 and 33 drive respectively the pinions 34 and 35 keyed to the shafts of the screws 24, 25, respectively. In the arrangement illustrated, output gear 32 drives output gear 33 in the opposing direction, and accordingly the pinions 34 and 35 are driven in opposing directions. The helical gears 24, 25 are so cut that when driven in opposing directions, they exert drive forces in a common direction on the oppositely-disposed protruding ears of the pusher dogs, as illustrated in FIG. 5 and as will be described.

In the embodiments shown in FIGS. 1–5, an endless belt 36 of leather or other suitable material, is supported above the passageway 29 formed between the spaced-apart helical gears 24, 25. The endless belt 36 may be supported by any suitable mechanism. In FIG. 1 of the drawing, belt 36 is illustrated as supported by the pulleys 37, 38 mounted, as by support arms 39, 40, above and beyond each end of the passageway 29 formed by the pair of screws 24, 25. Each of the pulleys 37, 38 is an idler pulley, neither being driven positively.

A guide channel 41 is provided in the passageway 29 between the screws 24, 25. In the drawing, guide channel 41 is shown to be supported on the spaced-apart crossbars 42, 43 of the frame 28. Guide channel 41 is further supported, at each of its ends, by the arched crossmembers 44 and 45, one mounted on each of the crossbars 42, 43.

As best seen in FIG. 3, secured to the undersurface of the spaced-apart arched members 44, 45 is an elongated plate 46 running lengthwise of the passageway 29. A similar elongated plate 47 is secured to the cross-bars 42, 43. Secured to the edges of the plates 46 and 47, respectively, are depending side plates 48, 49 and upstanding side plates 50, 51, forming therebetween, on each side of the guide channel, a lengthwise slot through which the ears 52, 53 of the pusher dogs 54 project during their passage through the guide channel 41 in the passageway 29.

Figure 2:
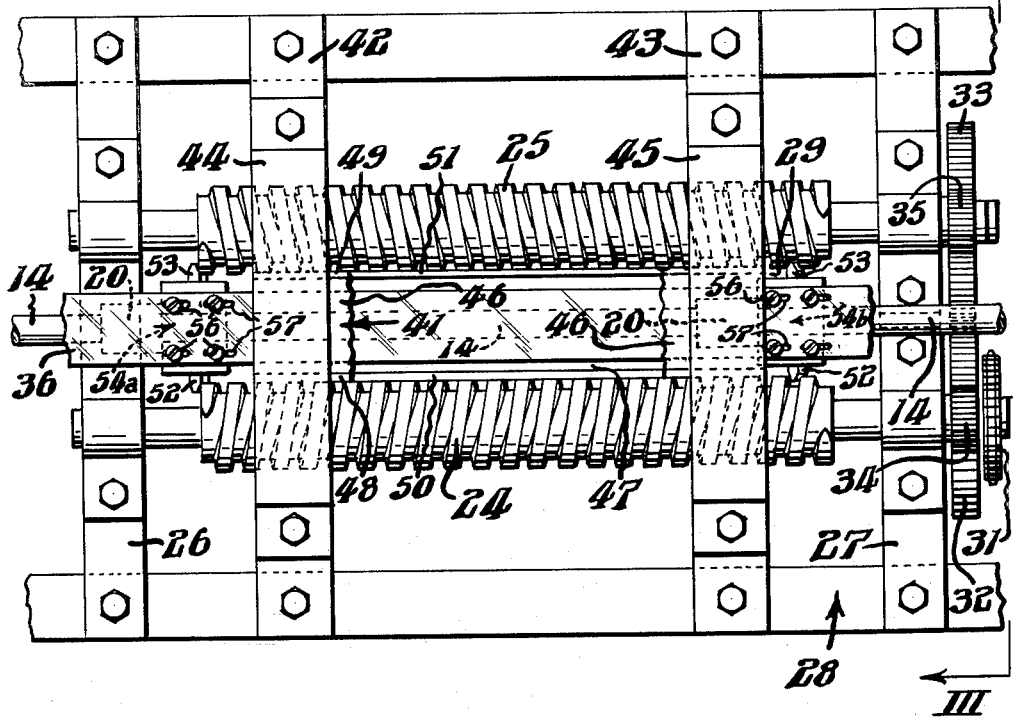
FIG. 2 is a diagrammatic plan view looking down along the line II—II of FIG. 1.
Figure 4:
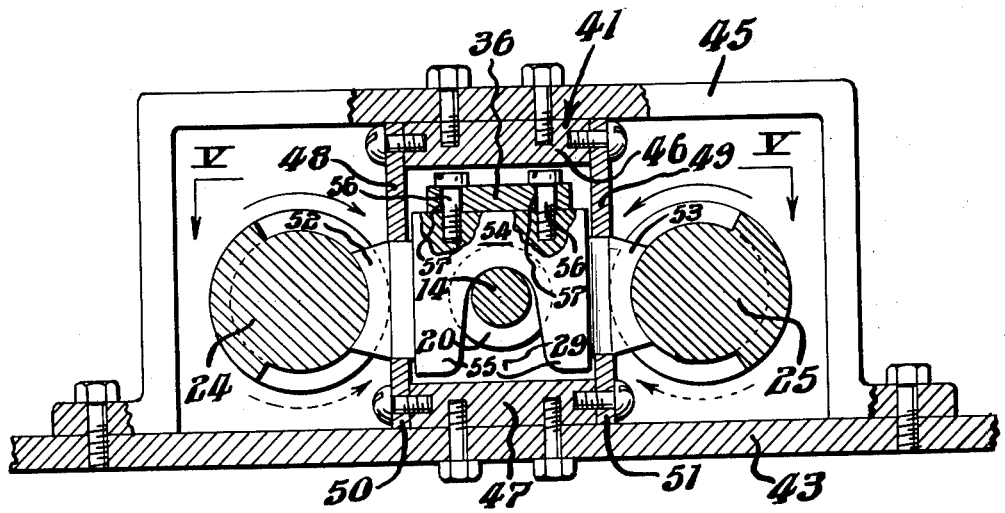
FIG. 4 is a diagrammatic view in section looking in along the line IV—IV of FIG. 1.

Referring now to the pusher dogs 54, as best seen in FIGS. 3, 4, and 5, each of the pusher dogs includes a yoke portion 55, which straddles the rod of the sectional rod 14, and a pair of oppositely-disposed lateral projections or ears 52, 53 shaped and sized to fit into the grooves of the screws 24, 25 and to be pushed therealong by the helical threads as the screws rotate. Each dog 54 is mounted on the endless belt 36, as by four fastening screws 56. The spacing between the dogs 54 is made substantially equal to the spacing between the couplers 20 of the sectional rod 14. The length of each of the helical gears or screws 24, 25 is made greater than the distance or spacing between the dogs 54, so that at least one dog is always in mesh with the helical gears. That is to say, and as illustrated by the dogs 54a and 54b in FIG. 2, a following dog (54b) enters the grooves of the screws 24, 25 at the entrance end of the screw drive before the preceding dog (54a) arrives at the exit end. Ideally, each of the two dogs 54a and 54b, which are engaged at the same time in the grooves of the screw drive, will be in contact with a coupler 20 and pushing it along. As a practical matter, however, in some instances, due to a slight bend in the rod 14, to manufacturing tolerances, or to other causes, the distance between consecutive dogs may be slightly greater than the distance between consecutive couplers so that the following dog does not make physical contact with the coupler. In addition, the ears 52, 53 of the following dog 54b may be centered in the grooves of the screws 24, 25, as illustrated in FIG. 2, and may not be in contact with the forward wall of the helical thread. In such case, the screw drive does not exert any drive force on the second dog 54b, so long as the preceding dog 54a is being driven by the screw drive, the said second dog will be merely carried along by the moving belt 36 which is being moved forward by the forward movement of the screw-driven preceding dog. In such a situation, when the preceding or front dog 54a reaches the exit end of the screw drive, the force which had been driving the front dog ceases, and the endless belt 36 stops moving. As the helical gears or screws 24, 25 continue to rotate, the forward walls of the helical threads move against the projecting ears 52, 53 of the second dog 54b and exert a forward force thereagainst. This moves the second dog 54b forward and closes any gap which may exist between the dog 54b and the coupler immediately thereahead. Continued forward movement of the dog 54b drives the endless belt 36 forward.

In order to allow the second or following dog 54b to move up and close any slight gap that may have existed between it and the coupler ahead of it when the front dog 54a alone was providing the drive force on the sectional rod, short slots 57 are provided in endless belt 36 for each of the four screws 56 which secure the dog to the belt. These slots allow the front or forward dog 54a to move rearward relative to the belt 36, and thus avoids any tendency to wrinkle the belt, when the belt is moved forward by the second or following dog 54b, when the latter dog takes over the drive. As the second or following dog 54b continues to be moved forward through the passageway 29 between the helical gears 24, 25, by the drive action of the screw drive, the carrier belt 36 is driven forward and the front or preceding dog 54a is carried along beyond the exit end of the screw drive. Before each driving dog reaches the exit end of the screw drive, a following dog arrives at the entrance end, and its opposing ears enter the grooves of the screws 24 and 25.

It will be seen that the present invention provides a positive drive for the pusher dogs and avoids any undesirable strain on the endless carrier belt.

The drive shown and described is reversible, as by reversing the reversible motor or engine 16, or by any other suitable known reversing mechanism. In the reverse direction, the screw drive operates in substantially the same way to move the sectional rod into the cage 12, to the right as shown in FIG. 1 of the drawing. At the time of reversal, there is, of course, a slight delay in rod movement awaiting travel of the dog in the screw drive through the spacing between couplers.

A modified form of screw drive is shown in FIGS. 6–9. The modification is not in the screw drive itself, but in the carrier means for the pusher dogs. In the modified form, in lieu of a movable endless belt for transporting the pusher dogs, a motionless guide track 136, C-shaped in side-elevational cross-section, is provided, as seen in FIGS. 6 and 7. In these figures only one of the two corresponding halves is seen. As seen in FIG. 8, the two halves face each other in opposing fashion, the opposing grooves 137 forming a guide track for receiving the opposing ears 152 and 153 of the dogs 154. The entire track is filled with dogs, one abutting the other.

As a further modification, the dogs 154 have a double-yoke as shown in FIG. 9. It will be seen that the dogs 154 have a yoke at each end, 155a and 155b, and are designed to straddle the coupler, as indicated in FIGS. 6 and 7.

In FIG. 6, the dog 154a is being driven forward (to the left, as seen in the drawing) by a screw drive which is similar to that already described in connection with FIGS. 1–5. Dog 154a is shown straddling coupler 120a. When the following coupler 120b reaches the next following dog 154b, the coupler 120b will engage the forward yoke of dog 154b and move the dog forward. The dog will then settle down over the coupler 120b and straddle the same, as indicated in FIG. 7. As the front or forward dog 154a leaves the exit end of the screw drive, it engages the next preceding dog 154j in the track 136 and pushes it ahead, thus moving the entire line of dogs and causing the now last of the dogs 154c in the track to take up the end position previously occupied by dog 154b in FIG. 6. The dogs 154 used in the modified form of drive illustrated in FIGS. 6–9 are shown as having cylindrical ears 152, 153 since this form is better suited for movement along the grooves 137 of the guide track 136.

The form of drive shown in FIGS. 6–9 is, of course, reversible. Upon reversal, one yoke of the double-yoke dog applies a drive force to the straddled coupler 120 substantially instantly, without delay. Thus, the form of return track shown in FIGS. 6–9 in combination with the form of dog shown, having a pair of spaced-apart yokes straddling the rod, avoids the delay introduced at time of reversal of the form of drive and return system shown in FIGS. 1–5.

In FIG. 10, there is shown a modification of the apparatus of FIG. 1. In FIG. 10, the endless belt 236 is supported by a pair of pulleys, such as 238, one at each end, mounted as by support arms such as 240 above and within (rather than beyond) each end of the passageway 229 formed between the pair of screws 224 and 225 (the latter being hidden in FIG. 10). In FIG. 10, two dogs 254 are seen, one of which is in the passageway and engaged by the screws 224 and 225.

While the preferred embodiments of this invention have been described in some detail, it will be obvious to one skilled in the art that various modifications may be made without departing from the invention as hereinafter claimed.

Having described my invention, I claim:

1. In a rodding machine for handling sectional rod comprising individual sections of rod coupled end-to-end by couplers, drive means for driving the sectional rod in its axial direction, said drive means comprising: a pair of parallel screws mounted for axial rotation on said machine in spaced-apart relation forming therebetween a passageway through which said sectional rod is passed; power means connected to said screws for driving said screws rotationally; a plurality of pusher dogs, each provided with opposing ears protruding laterally from each side and adapted to be engaged by the threads of said screws, thereby to move said dogs through said passageway when said screws are rotated; and transport means mounted on said machine for returning said dogs from the point at which said dogs leave said passageway to the point at which said dogs enter said passageway.

2. Apparatus as claimed in claim 1 characterized in that said transport means for said pusher dogs comprises a movable endless belt on which said pusher dogs are mounted at spaced locations therealong, the spacing between said dogs on said belt being approximately equal to the distance between the couplers on said sectional rod, the length of said screws being greater than the spacing between said dogs so that at least one dog is always in engagement with said screw.

3. Apparatus as claimed in claim 2 further characterized in that said endless belt is mounted on a pair of spaced-apart idler pulleys mounted on said machine, one above each end of the passageway formed by said pair of screws.

4. Apparatus as claimed in claim 3 further characterized in that said pusher dogs are mounted in small slots on said belt for limited axial movement.

5. Apparatus as claimed in claim 4 further characterized in that a guide channel for said belt and dogs is provided in the passageway between said pair of screws.

6. Apparatus as claimed in claim 1 characterized in that said transport means for said pusher dogs comprises a motionless guide track mounted on said machine in the vertical plane of said passageway, and connecting one end of the passageway to the other.

7. Apparatus as claimed in claim 6 further characterized in that said pusher dogs have spaced-apart depending yoke portions for straddling said rod and a common connecting portion for overlying a coupler, the depending yoke portions being adapted for pushing against either end of said coupler according to the direction of rotation of the screws.

References Cited in the file of this patent

UNITED STATES PATENTS

| | | |
|---|---|---|
| 2,544,256 | Ciaccio | Mar. 6, 1951 |
| 2,757,883 | Schlang et al. | Aug. 7, 1956 |
| 3,001,761 | Pittman | Sept. 26, 1961 |